United States Patent
Omeni

(10) Patent No.: US 8,873,520 B2
(45) Date of Patent: Oct. 28, 2014

(54) TDMA-BASED WIRELESS NETWORKS

(75) Inventor: Okundu Omeni, London (GB)

(73) Assignee: Toumaz UK Limited, Oxfordshire (GB)

(*) Notice: Subject to any disclaimer, the term of this patent is extended or adjusted under 35 U.S.C. 154(b) by 312 days.

(21) Appl. No.: 13/022,724

(22) Filed: Feb. 8, 2011

(65) Prior Publication Data

US 2012/0201231 A1    Aug. 9, 2012

(51) Int. Cl.
*H04B 7/12* (2006.01)
*H04B 7/26* (2006.01)
*H04W 72/04* (2009.01)
*H04W 16/14* (2009.01)
*H04W 72/08* (2009.01)
*H04W 84/18* (2009.01)

(52) U.S. Cl.
CPC ......... *H04B 7/2656* (2013.01); *H04W 72/0426* (2013.01); *H04W 16/14* (2013.01); *H04W 72/082* (2013.01); *H04W 84/18* (2013.01)
USPC ...................................... 370/337

(58) Field of Classification Search
CPC ............................ H04W 84/18; H04B 7/2656
USPC ............................. 370/311, 345, 337
See application file for complete search history.

(56) References Cited

U.S. PATENT DOCUMENTS

| | | | | |
|---|---|---|---|---|
| 5,940,765 | A * | 8/1999 | Haartsen | 455/462 |
| 2003/0152059 | A1* | 8/2003 | Odman | 370/338 |
| 2004/0114563 | A1* | 6/2004 | Shvodian | 370/347 |
| 2005/0180385 | A1* | 8/2005 | Jeong et al. | 370/350 |
| 2006/0268891 | A1* | 11/2006 | Heidari-Bateni et al. | 370/395.4 |
| 2007/0025384 | A1* | 2/2007 | Ayyagari et al. | 370/445 |
| 2008/0130483 | A1* | 6/2008 | Khandekar et al. | 370/208 |
| 2009/0180452 | A1* | 7/2009 | Kim et al. | 370/338 |
| 2009/0323714 | A1* | 12/2009 | Tervonen et al. | 370/443 |
| 2009/0325479 | A1* | 12/2009 | Chakrabarti et al. | 455/7 |
| 2010/0034159 | A1* | 2/2010 | Shin et al. | 370/329 |
| 2010/0111050 | A1* | 5/2010 | Jeong | 370/337 |
| 2010/0195601 | A1* | 8/2010 | Zhang | 370/329 |
| 2010/0296493 | A1* | 11/2010 | Lee et al. | 370/336 |
| 2011/0164605 | A1* | 7/2011 | Zhen et al. | 370/347 |
| 2011/0310770 | A1* | 12/2011 | Liang et al. | 370/254 |
| 2012/0063395 | A1* | 3/2012 | Ho | 370/329 |
| 2012/0155279 | A1* | 6/2012 | Ho | 370/241 |
| 2013/0114558 | A1* | 5/2013 | Wang | 370/329 |

OTHER PUBLICATIONS

Enhanced superframe structure of the IEEE802.15.4 standard for real-time data transmission in star network.*

* cited by examiner

*Primary Examiner* — Nicholas Jensen
*Assistant Examiner* — Syed S Ali
(74) *Attorney, Agent, or Firm* — Saul Ewing LLP

(57) ABSTRACT

According to a first aspect of the present invention there is provided a method for enabling two or more TDMA-based wireless networks to share a communication channel, each wireless network implementing superframes. The method comprises within each network, implementing active superframes separated by one or more inactive superframes and only implementing active superframes when the other networks are implementing inactive superframes, wherein a network only communicates during that networks active superframes and does not communicate during that networks inactive superframes.

19 Claims, 5 Drawing Sheets

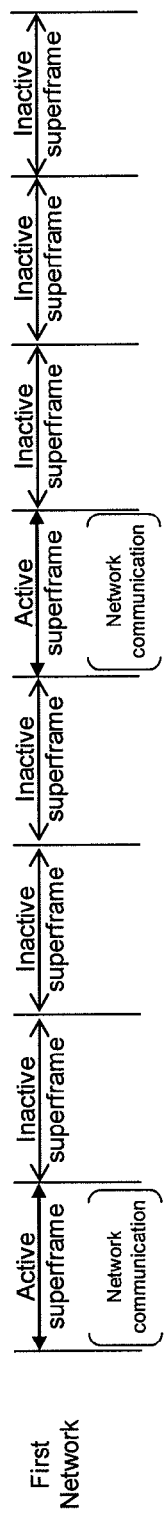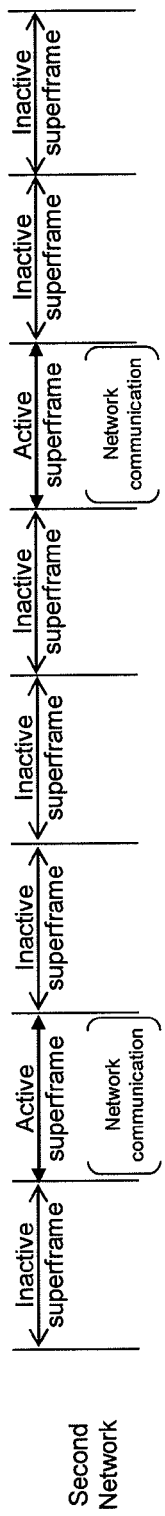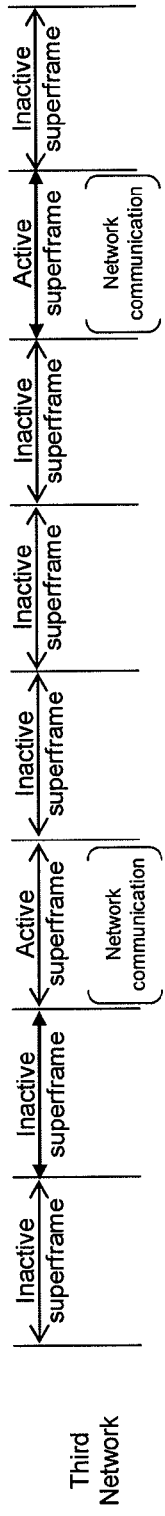
Figure 4a
Figure 4b
Figure 4c

TDMA-BASED WIRELESS NETWORKS

FIELD OF THE INVENTION

This invention relates to TDMA-based wireless networks. In particular, this invention relates to methods and apparatus for enabling two or more TDMA-based wireless networks to coexist whilst using the same communication channel.

BACKGROUND TO THE INVENTION

Time division multiple access (TDMA) is a channel access method that allows multiple devices within a single network to share the same communication channel (e.g. frequency channel) by dividing the channel into different time slots. The devices transmit in sequence, one after the other, each using their own time slot. Typically, a communication channel utilising TDMA will be split into superframes with each superframe being divided into a fixed number of time slots, each time slot within each superframe being available for use by a different device. For example, for a communication channel whose individual superframes include eight time slots, that communication channel could be shared by up to eight different devices, with each device being allocated a slot within each superframe. In addition, TDMA-based communication networks usually make use of beacons, wherein a beacon is a frame periodically broadcast by a central node, base station or hub to facilitate network management functions. For example, these management functions can include clock synchronization and coordination of access and power management of the network nodes that are connected to or require connection to the central node/base station/hub. The period between transmissions of the beacon is divided into a number of slots and can be referred to as a beacon period or beacon interval, and all communication within the network during the beacon period is implemented within a superframe structure. FIG. 1 illustrates an example of a basic superframe.

Personal Area Networks (PAN), Wireless Sensor Networks (WSN), Body Area Networks (BAN) and Body Sensor Networks (BSN) are typically comprised of a number of small wireless devices or sensors that communicate with a hub or base station over relatively short distances. The small size of these devices places limits on their battery life and means that minimizing their power consumption is an important consideration. For this reason, these networks tend to use TDMA-based communication. However, given the potential number of different applications that may make use of such wireless networks and that there are likely to be a large number of networks for each application, interference between networks that are in relatively close proximity is a potential problem. In particular, the large number of such networks will likely mean that communication channels are re-used by a number of individual networks, and that mechanisms that allow these networks to coexist whilst using the same communication channel will be required.

Currently, coexistence between multiple TDMA-based beacon-enabled networks has only be achieved if each network defines a number of frames within each of its superframes as inactive, such that they can be used by neighbouring networks. This is illustrated in FIG. 2, in which a superframe is divided into a number of slots S, with A active slots such that there are (S-A) inactive slots. However, this approach has the disadvantage that it requires a lot of coordination between the networks, and the complexity of this coordination increases exponentially as the number of networks increases.

It is therefore an aim of the present invention to provide a TDMA-based communication method and system that addresses the aforementioned problems.

SUMMARY OF THE INVENTION

According to a first aspect of the present invention there is provided a method for enabling two or more TDMA-based wireless networks to share a communication channel, each wireless network implementing superframes. The method comprises within each network, implementing active superframes separated by one or more inactive superframes and only implementing active superframes when the other networks are implementing inactive superframes, wherein a network only communicates during that networks active superframes and does not communicate during that networks inactive superframes.

The method may further comprise, at each network:

when the network wants to begin using the communication channel, determining if one or more other networks are using the communication channel;

if it is determined that no other networks are using the communication channel, implementing active superframes separated by one or more inactive superframes; and if it is determined that one or more other networks are using the communication channel, determining if a superframe is available during which the one or more other networks are all implementing inactive superframes and, if there is a superframe available, implementing active superframes separated by one or more inactive superframes and only implementing active superframes when the other networks are implementing inactive superframes.

Each network may transmit a beacon during that networks active superframes. A beacon may include an indication of when the network that transmitted the beacon will implement active superframes and when it will implement inactive superframes. A beacon may also include a sequence value indicating when the network that transmitted the beacon began using the communication channel relative to the other networks that are using communication channel.

The step of determining if one or more other networks are using the communication channel may comprise attempting to detect beacons that are transmitted by one or more other networks, if no beacons are detected, determining that no other networks are using the communication channel, and if one or more beacons are detected, determining that one or more other networks are using the communication channel.

The step of determining if a superframe is available during which the one or more other networks are all implementing inactive superframes may comprise, for each beacon that is detected, analysing the beacon to determine when the network that transmitted the beacon will implement active superframes and when it will implement inactive superframes.

The step of determining if a superframe is available during which the one or more other networks are all implementing inactive superframes may further comprise analysing the sequence value within each beacon that is detected to determine if there are any other networks using the communication channel for which a beacon has not yet been detected, and, if it is determined that there are other networks using the communication channel for which a beacon has not yet been detected, attempting to detect further beacons.

If a network intends to stop using the communication channel, then the network may include within a beacon subsequently transmitted by that network an indication of when the network intends to stop using the communication channel. If so, then the method may further comprise, at each network, if a network detects a beacon that includes an indication of when the network that transmitted the beacon intends to stop using the communication channel, determining when the network that transmitted the beacon stops using the communication channel and, if required, adjusting the sequence value included within a beacon subsequently transmitted by the network.

The indication of when the network intends to stop using the communication channel may comprise a value indicating the number of active superframes that the network will implement before it stops using the communication channel.

According to a second aspect of the present invention there is provided a hub for a TDMA-based wireless network. The hub comprises:

a transceiver for communicating with one or more nodes of the network using a communication channel; and a processor for implementing active superframes separated by one or more inactive superframes and only implementing active superframes when one or more other TDMA-based wireless networks that are also using the communication channel are implementing inactive superframes, wherein a network only communicates during that networks active superframes and does not communicate during that networks inactive superframes.

The processor may be further arranged to:

determine if one or more other networks are using the communication channel;

if it is determined that no other networks are using the communication channel, implement active superframes separated by one or more inactive superframes; and if it is determined that one or more other networks are using the communication channel, determine if a superframe is available during which the one or more other networks are all implementing inactive superframes and, if there is a superframe available, implement active superframes separated by one or more inactive superframes and only implement active superframes when the other networks are implementing inactive superframes.

The processor may be further arranged to transmit a beacon, using the transceiver, during the networks active superframes.

In order to determine if one or more other networks are using the communication channel, the processor may be further arranged to:

attempt to detect beacons that are transmitted by one or more other networks;

if no beacons are detected, then determine that no other networks are using the communication channel; and if one or more beacons are detected, then determine that one or more other networks are using the communication channel.

The processor may be further arranged to include within the beacon an indication of when the network will implement active superframes and when it will implement inactive superframes.

In order to determine if a superframe is available during which the one or more other networks are all implementing inactive superframes, the processor may be further arranged to, for each beacon that is detected, analyse the beacon to determine when the network that transmitted the beacon will implement active superframes and when it will implement inactive superframes.

The processor may be further arranged to include a sequence value within the beacon that indicates when the network that transmitted the beacon began using the communication channel relative to the other networks that are using communication channel.

In order to determine if a superframe is available during which the one or more other networks are all implementing inactive superframes, the processor may be further arranged to:

analyse the sequence value within each beacon that is detected to determine if there are any other networks using the communication channel for which a beacon has not yet been detected; and if it is determined that there are other networks using the communication channel for which a beacon has not yet been detected, then attempt to detect further beacons.

The processor may be further arranged to include within a beacon an indication of when the network intends to stop using the communication channel, if the network intends to stop using the communication channel.

The processor may be further arranged to:

detect a beacon that includes an indication of when the network that transmitted the beacon intends to stop using the communication channel;

determine when the network that transmitted the beacon stops using the communication channel; and if required, adjust the sequence value included within a subsequently transmitted beacon.

In order to include an indication of when the network intends to stop using the communication channel, the processor may be further arranged to include within a beacon a value indicating the number of active superframes that will be implemented before it stops using the communication channel.

According to a third aspect of the present invention there is provided a node for a TDMA-based wireless network. The node comprises:

a transceiver for communicating with a hub of the network using a communication channel; and a processor for ensuring that communication only takes place during active superframes and does not take place during inactive superframes, the active superframes and inactive superframes having been defined in instructions received from the hub.

According to a fourth aspect of the present invention there is provided a TDMA-based wireless communication system, the system comprises a hub according to the second aspect of the present invention, and one or more nodes. The one or more nodes may be in accordance with the third aspect of the present invention.

BRIEF DESCRIPTION OF THE DRAWINGS

FIG. 4a illustrates an example of the operation of a first network;

FIG. 4b illustrates an example of the operation of a second network;

FIG. 4c illustrates an example of the operation of a third network;

DETAILED DESCRIPTION OF CERTAIN EMBODIMENTS

There will now be described an efficient, low power method for enabling coexistence of two or more TDMA-based wireless networks or communication systems that each make use of the same communication channel. The method involves each wireless network implementing active superframes separated by one or more inactive superframes, wherein each network only communicates during that wireless networks active superframes and does not communicate during that wireless networks inactive superframes, and each wireless network only implementing active superframes when the other wireless networks are implementing inactive superframes.

Figure 1:
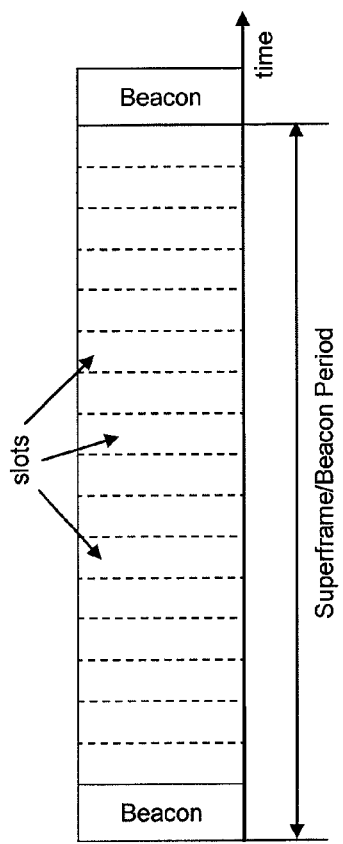
FIG. 1 illustrates an example of a basic superframe.
Figure 2:
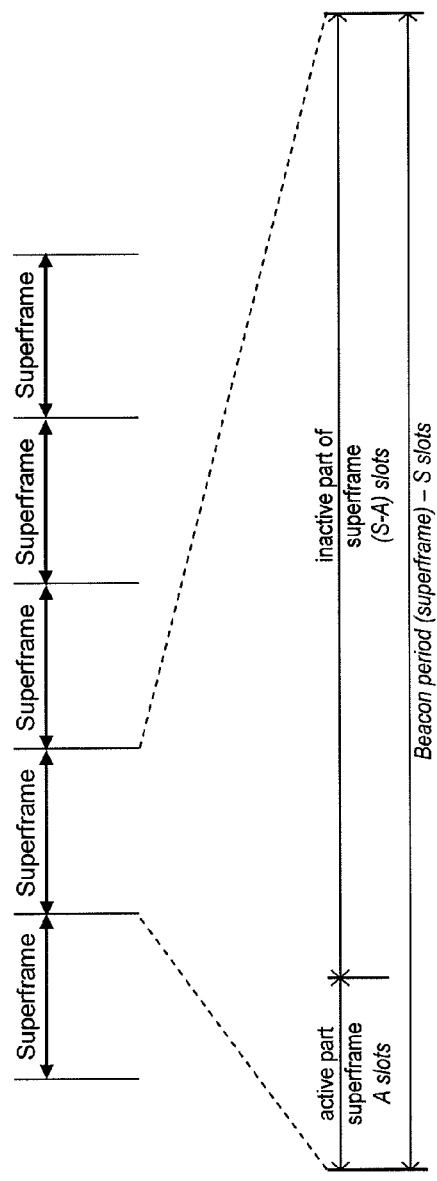
FIG. 2 illustrates an example of a superframe divided into active slots and inactive slots.
Figure 3:
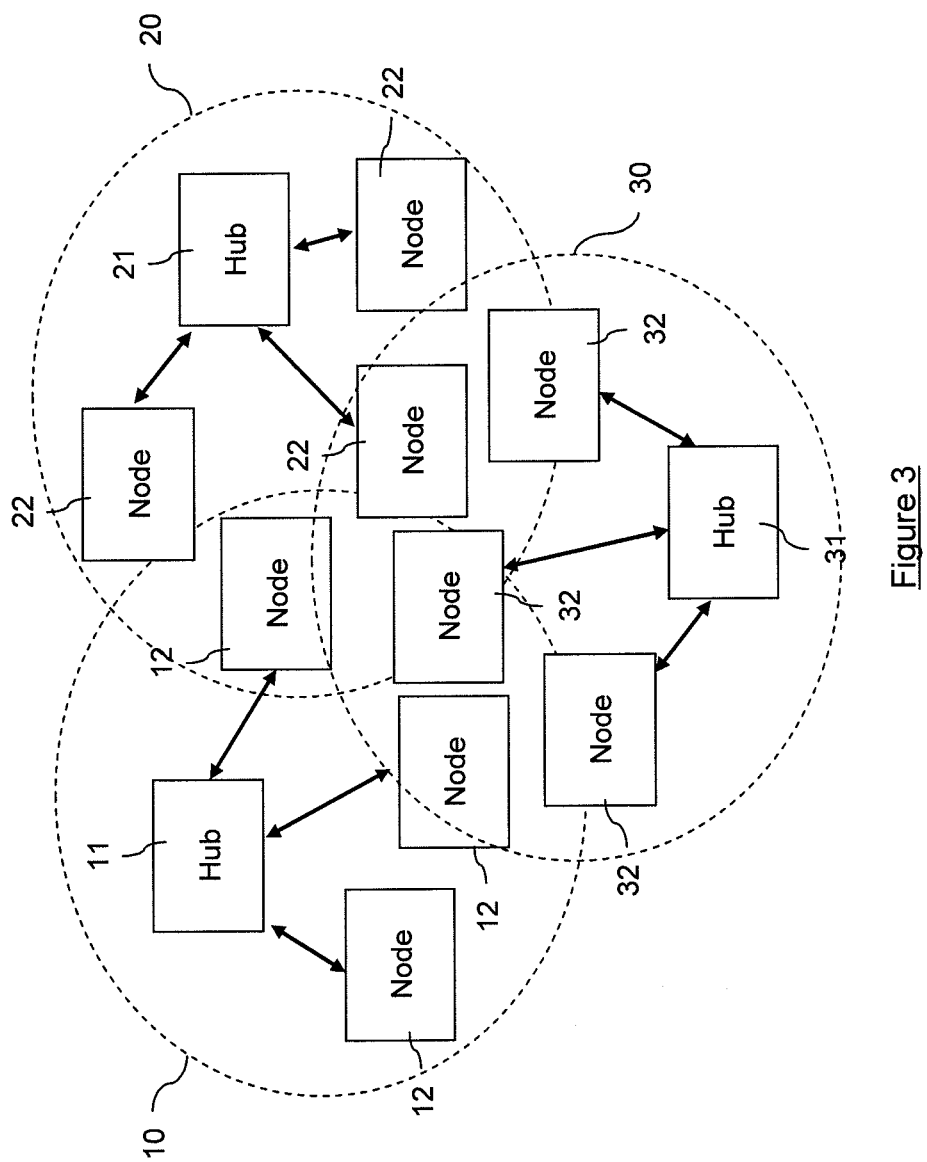
FIG. 3 illustrates schematically three TDMA-based wireless communications networks.

FIG. 3 illustrates schematically three TDMA-based wireless communications networks 10, 20, 30 that are in relatively close proximity to one another. By way of example, each of the networks may be any of a Wireless Sensor Network (WSN), a Personal Area Network (PAN), a Body Area Network (BAN) or a Body Sensor Network (BSN). The first network 10 comprises a hub 11 that is configured for wireless TDMA-based communication with a number of network nodes 12. The second network 20 comprises a hub 21 that is configured for wireless TDMA-based communication with a number of network nodes 22. The third network 30 also comprises a hub 31 that is configured for wireless TDMA-based communication with a number of network nodes 32.

When the hub 11 within the first network 10 wants to begin using a communication channel to communicate with the network nodes 12, the hub 11 detects any beacons that are being transmitted on the communication channel in order to determine if the communication channel is also being used by any other networks. In this example, the second network 20 and third network 30 have not yet begun communicating on the communication channel, such that hub 11 does not detect any beacons on the communication channel. Therefore, the hub 11 configures the first network 10 to use the communication channel by implementing active superframes separated by one or more inactive/idle superframes. Any communication between the hub 11 and the network nodes 12 over the communication channel then takes place during an active superframe, whilst no communication take places during the one or more inactive/idle superframes.

Subsequently, when the hub 21 within the second network 20 wants to begin using the same communication channel to communicate with the network nodes 22, this hub 21 detects any beacons that are being transmitted on the communication channel in order to determine if the communication channel is being used by any other networks. As the first network 10 is already communicating using this communication channel, the hub 21 within the second network 20 will detect the beacon that is transmitted at the start of the first networks 10 active superframe. The hub 21 within the second network 20 will therefore configure the second network 20 to use the communication channel by implementing active superframes separated by one or more inactive/idle superframes, but will configure the network 20 to implement its active superframes when the first network 10 is implementing its inactive/idle superframes. This allows the first network 10 and the second network 20 to coexist without interference, and without the need for the two networks to actively cooperate/communicate with each other in order to establish this coexistence.

When the hub 31 within the third network 30 then wants to begin using the same communication channel, this hub 31 also detects any beacons that are being transmitted on the communication channel. In this case, as both the first network 10 and the second network 20 are already communicating using this communication channel, the hub 31 within the third network 30 will detect the beacon that is transmitted at the start of the first networks 10 active superframes and the beacon that is transmitted at the start of the second networks 20 active superframes. Therefore, provided that there are still inactive/idle superframes between the active superframes of the first network 10 during which no other network is implementing an active superframe, then the hub 31 within the third network 30 will configure the third network 30 to use the communication channel by implementing active superframes separated by one or more inactive/idle superframes. However, the hub 31 will configure the third network 30 to only implement its active superframes when both the first network 10 and the second network 20 are implementing inactive/idle superframes. This allows the first network 10, the second network 20 and the third network 30 to coexist without interference, and without the need for the three networks to actively cooperate/communicate with each other in order to establish this coexistence.

In addition, further networks can also begin to communicate using the same communication channel provided that there are still inactive/idle superframes available between the active superframes of the first network 10 during which no other network is implementing an active superframe.

FIGS. 4a, 4b and 4c illustrate examples as to how the three networks can configure themselves in order to achieve coexistence. FIG. 4a illustrates an example of the operation of the first network 10. As can be seen from FIG. 4a, the first network implements an active superframe followed by three inactive/idle superframes, and communication within the first network (i.e. between the hub 11 and the network nodes 12) only occurs during the active superframe.

FIG. 4b illustrates an example of the corresponding operation of the second network 20. As can be seen from FIG. 4b, the second network also implements an active superframe followed by three inactive/idle superframes, and communication within the network only occurs during the active superframe. However, the active superframes of the second network 20 are only implemented during the first of the three inactive/idle superframes implemented by the first network 10, when the first network 10 is not communicating using the communication channel.

In FIG. 4c, as with the first network 10 and the second network 20, the third network 30 also implements an active superframe followed by three inactive/idle superframes, and communication within the network only occurs during the active superframes. However, the active superframes of the third network 30 are only implemented during the second of the three inactive/idle superframes implemented by the first network 10, when both the first network 10 and second network 20 are implementing inactive/idle superframes, and therefore when neither the first network 10 nor the second network 20 are communicating using the communication channel.

In the examples of FIGS. 4a, 4b and 4c, there is still one inactive/idle superframe between the active superframes of the first network 10 during which no other network is implementing an active superframe. As such, it is still possible that a fourth network could begin communicating using the communication channel, by only implementing an active superframe during the last of the three inactive/idle superframes implemented by the first network 10, when the first network 10, second network 20 and the third network 20 are implementing inactive/idle superframes.

By implementing active superframes separated by inactive superframes, and by passively detecting the active superframes of any networks that are already using a communication channel, a number of networks can configure themselves to use the same communication channel without interfering with one another, and without the need for active communication between the networks. The methods described above therefore provide a mechanism for mitigating against any interference that may occur when two or more TDMA-based wireless communication networks want to make use of the same communication channel, and thereby allows these networks to coexist whilst in relative proximity.

In addition, in comparison with the conventional methods for achieving coexistence, in which each network defines a number of slots within a superframe as idle or inactive, the above described methods are less complex to implement. For example, according to the above described method, if a network were required to implement 1 active superframe followed by 49 inactive superframes, with each superframe having 100 time slots, then the network hub would only be required to count 50 superframes and 100 time slots per superframe. In contrast, if a network implementing the conventional method were required to implement the same ratio of active slots to inactive slots, then the hub within the network would be required to count 5000 slots within 1 superframe. Furthermore, using the conventional method, the slot pointer or slot number used to address each slot within a superframe would have to be expressed using a number of bytes in order to address the large number of slots required. When using the methods described above, the slot numbers used to address each slot within a superframe can be expressed using a single byte.

In order to enable networks to make use of the same communication channel, the hub within first network that begins communicating using that channel can include information within its beacon that defines how the network implements its active and inactive superframes, and that thereby allows further networks to determine when they should implement their active superframes. For example, this information could include the length of the superframes implemented by the first network and an indication of the number of inactive/idle superframes implemented between the active superframes, as well as information that enables any subsequent networks to synchronise their clocks with that of the first network. A hub within a second network that also wants to make use of the communication channel will then detect the beacon transmitted by the hub within first network, and use the information in the beacon to determine when the first network will be implementing active superframes and when the first network will be implementing inactive/idle superframes. The hub within the second network can then configure the second network to implement its active superframes when the first network is implementing an inactive/idle superframe.

As with the first network, the hub within second network can also include information within its beacon that defines how the second network implements its active and inactive superframes. A hub within a third network will then detect the beacons transmitted by both the first network and the second network. The hub within the third network will then know that there are two other networks using the communication channel and will be able to use the information in either or both beacons to determine when it should implement its active superframes.

In addition, the beacons transmitted by each of the networks that share a communication channel can also include a sequence number or pilot number indicating the order in which the networks began using the communication channel. For example, the beacon transmitted by the hub within the first network could include a sequence number of 0, indicating that this was the first network to begin using the communication channel. The hub within second network would then include a sequence number of 1 in its beacon, indicating that this network was the second network to begin using the communication channel. The hub within the next network to begin sharing the communication channel will then include a sequence number of 2 in its beacon. The inclusion of these indications can assist any networks that subsequently want to begin using the communication channel to determine how many networks are currently using the channel. This may be particularly useful if not all of the networks overlap at all times. For example, if a hub within a network that wants to begin using a communication channel detects five beacons, but the highest sequence number included within these beacons indicates that there are at least six networks currently using this communication channel, then the hub can be configured to continue in its attempts to detect any transmitted beacons before determining when to transmit its active superframes. The inclusion of this sequence number therefore further enables multiple networks to make use of the same communication channel without interference, and without the need for active cooperation or communication between the networks.

A hub within a network can also include within its beacon an indication of when it intends to stop using the communication channel. From this indication, the other networks that share the communication channel can be aware of when a network intends to stop using the communication channel, and can therefore adjust their sequence numbers accordingly. This indication can therefore be used to ensure that the sequence numbers included within the beacons are an accurate reflection of the number of networks currently using a communication channel. For example, when a hub within a first network becomes aware that it will shortly stop communicating, it can include, within the next beacon that it transmits, an indication of the number of active superframes that it intends to implement before communication ends. In the following beacon, the hub within the first network will reduce the number of active superframes remaining by one, and will continue to reduce this number by one in each subsequent beacon until the first network stops communicating. From this number, each of the other networks sharing the communication will be aware of when the first network will no longer be using the communication channel, and can be configured to reduce their sequence number by one when the first network stops using this communication channel. A new network that then wants to begin using the communication channel can therefore rely on the sequence numbers within the beacons of each network as an accurate indication of the number of networks using the communication channel, even if one or more networks have stopped using the communication channel.

In order to ensure that multiple networks can share the same communication channel without actively cooperating or communicating, the networks should be configured to implement their superframes such that the relative length of the active and inactive periods implemented by each network are the same. Each network should therefore implement superframes of the same duration, and with the same ratio of active superframes to inactive superframes. This simplifies how each network defines its superframe implementation and minimises the information that needs to be included within the beacon in order to communicate this definition to any other networks. For example, if a first network implements superframes that have 100 slots of 1 ms duration, wherein one active superframe is followed by nine inactive superframes, then ideally any other networks that want to use the same communication channel will also implement superframes that have 100 slots that each have a duration of 1 ms, and implement one active superframe followed by nine inactive superframes. However, the structure/format of the superframes need not be exactly the same. For example, a first network could implement superframes that have 100 slots of 1 ms duration, wherein one active superframe is followed by four inactive superframes, whilst a second network implements superframes that have 50 slots that each have a duration of 2 ms, with one active superframe being followed by four inactive superframes.

If an additional network wants to begin using a communication channel, but determines that this channel is already being used by a number of other networks and that there are no superframes available during which the networks already using the communication channel are only implementing an inactive superframe (i.e. there are no inactive superframes available for use by the additional network), then the additional network may initiate active communication with the other networks in order to request their cooperation. For example, the additional network may send a message to each of the other networks requesting that they begin implementing an additional inactive superframe between their active superframes, and thereby make an inactive superframe available during which the additional network can implement its active superframe. In such circumstances, all of the networks would be required to accept this request before any of the networks adjust the way in which they implement their superframes. Alternatively, if it is desired that no active communication take place between networks, then the networks could be configured to determine that they cannot use a communication channel on which there are no available inactive superframes.

Figure 5:
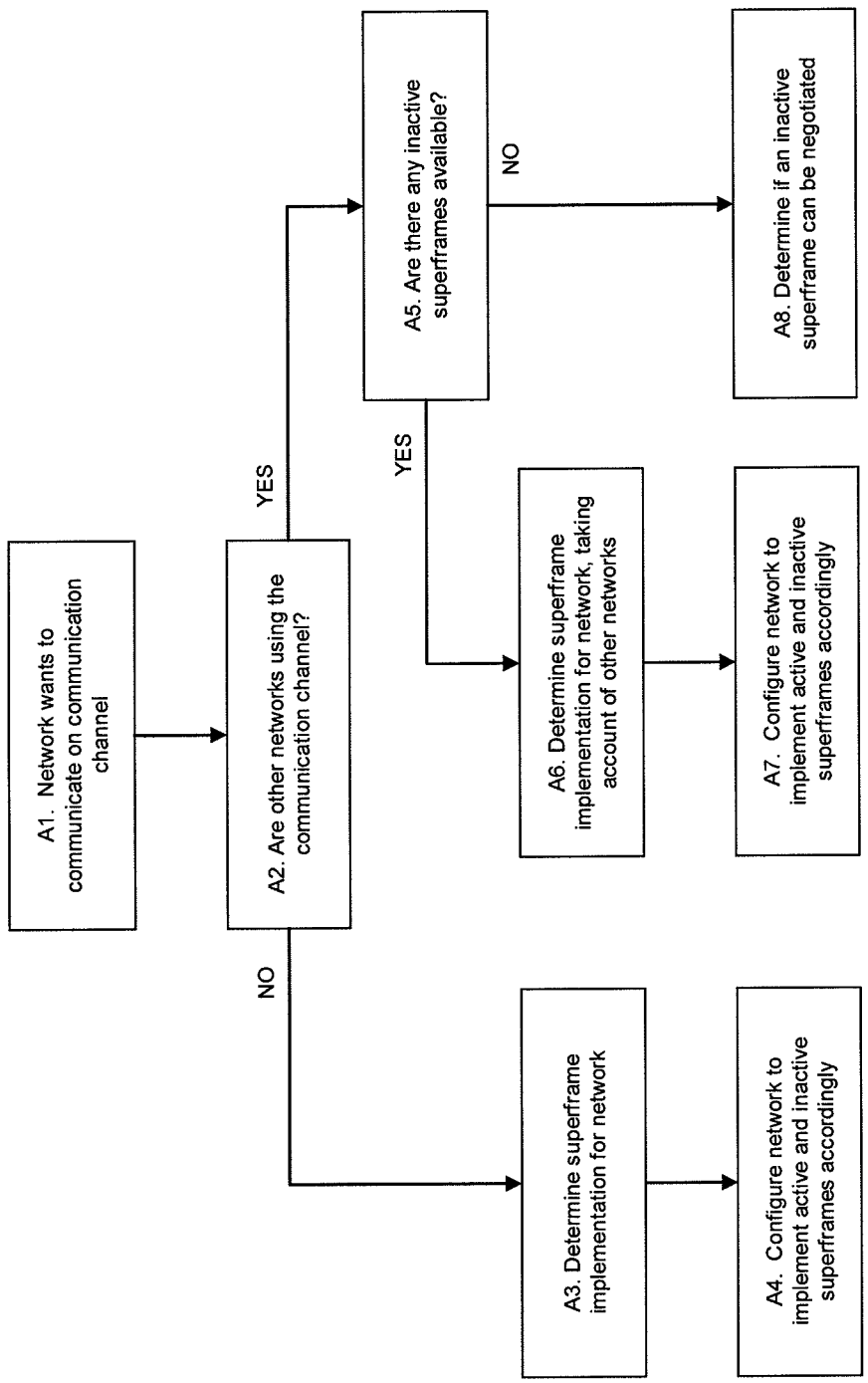
FIG. 5 is a flow diagram illustrating an example of the process implemented by a hub of a TDMA-based wireless network.

FIG. 5 is a flow diagram illustrating an example of the process implemented by the hub of a TDMA-based wireless network when it wants to begin using a communication channel. The steps performed are as follows:

A1. The hub within the network determines that it wants to begin using a communication channel.

A2. The hub determines if one or more other networks are using the communication channel. If it is determined that no other networks are using the communication channel then the process proceeds to step A3. If it is determined that one or more other networks are using the communication channel then the process proceeds to step A5. For example, in order to determine if one or more other networks are using the communication channel, the hub can attempt to detect any beacons that are already being broadcast on the communication channel. If no beacons are detected, then the hub determines that no other networks are using the communication channel. If one or more beacons are detected, then the hub determines that one or more other networks are using the communication channel.

A3. If it is determined that no other networks are using the communication channel, then the hub determines how superframes will be implemented within the network. As no other networks are using the communication channel, there are no restrictions on how the hub can define it's superframe implementation, and the hub can configure the network in accordance with it's own requirements. However, in order to ensure that the network can achieve coexistence with any other networks that subsequently want to begin using the communication channel, without the need for an active cooperation/communication between the networks, the hub will be arranged to determine the networks superframe implementation so as to include active superframes separated by one or more inactive superframes.

A4. The hub will then configure the network, by instructing the network nodes, to implement active and inactive superframes accordingly.

A5. If it is determined that one or more other networks are using the communication channel, then the hub will determine if there are any superframes available during which the one or more other networks are all implementing inactive superframes. If it is determined that there is a superframe available, then the process proceeds to step A6. If it is determined that there are no superframes available, then the process proceeds to step A8. For example, in order to determine if there are any superframes available, the hub can analyse each beacon that it has detected, to determine when each of the detected networks implement active superframes and when they implement inactive superframes. In addition, if the beacons detected by the hub include a sequence value indicating when the network that transmitted the beacon began using the communication channel relative to the other networks that are using communication channel, then the hub will also analyse the sequence value within each of the detected beacons to determine if there are any other networks using the communication channel for which a beacon has not yet been detected. As such, if it is determined that there are other networks using the communication channel for which a beacon has not yet been detected, the hub will then continue to attempt to detect further beacons.

A6. If it is determined that there is a superframe available, then the hub determines how superframes will be implemented within the network, taking account of the superframe implementations of the other networks, such that active superframes are only implemented when the other networks are implementing inactive superframes.

A7. The hub will then configure the network, by instructing the network nodes, to implement active and inactive superframes accordingly.

A8. If it is determined that there are no superframes available, then the hub will determine if an inactive superframe can be negotiated using active communication with the other networks that a using the communication channel. For example, the hub may be configured to never actively communicate with other networks, and will therefore need to determine if it can make use of an alternative communication channel. Alternatively, an analysis of the beacons broadcast by the other networks may indicate that these other networks do not allow active communicate between networks. As a further example, the hub may begin active communication with the other networks in an attempt to negotiate the implementation of an additional inactive superframe that could be used by the network.

When using the methods described above to achieve coexistence it is possible that one or more networks could attempt to begin using the same communication channel at the same time, such that the networks would not detect each other prior to determining their superframe implementations. As a result, it is therefore possible that these networks may initially configure themselves to implement their active superframes at the same time, such that collision occurs between the communications of these networks. To resolve this situation, the hubs within the networks could be configured to detect repeated collisions, and to reinitiate the process of network detection and superframe implementation if repeated collisions are detected.

Figure 6:
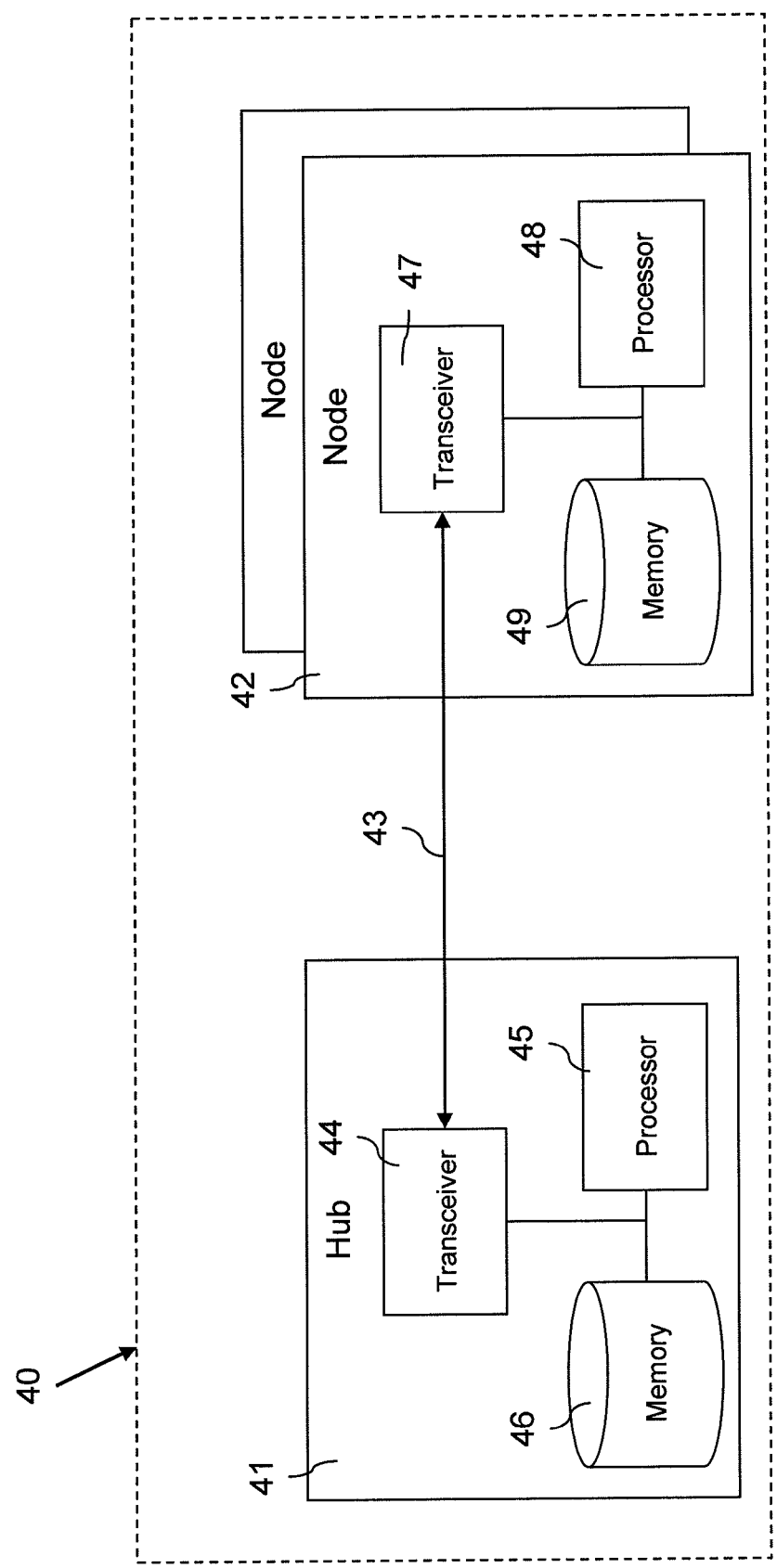
FIG. 6 illustrates schematically an embodiment of a TDMA-based wireless communication system.

FIG. 6 illustrates schematically an embodiment of a TDMA-based wireless communication system 40 configured to perform the methods described above. The wireless communication system comprises a hub 41 in communication with one or more nodes 42 over a communication channel 43.

The hub 41 can be implemented as a combination of computer hardware and software, and comprises a transceiver 44, a processor 45 and a memory 46. The memory 46 stores the various programs/executable files that are implemented by the processor 45, and also provides a storage unit for any required data. The programs/executable files stored in the memory 46, and implemented by the processor 45, can include a superframe implementation unit, a detection unit for detecting beacons transmitted by other TDMA-based wireless networks that use the same communication channel, an analysis unit for analysing the information included in any detected beacons, and a clock unit for synchronising the hub 41 with the network nodes 42 and for synchronising the network with any other networks that use the same communication channel. The transceiver 44 is used to enable the hub 41 to communicate with the nodes 42 of the communication system 40 and for receiving beacons transmitted by hubs in any other communication systems.

Each of the nodes 42 can also be implemented as a combination of computer hardware and software, and comprises a transceiver 47, a processor 48 and a memory 49. The memory 49 stores the various programs/executable files that are implemented by the processor 48, and also provides a storage unit for any required data. The programs/executable files stored in the memory 49, and implemented by the processor 48, can include a superframe implementation unit for implementing active and inactive superframes in accordance with instructions received from the hub 41 and a clock unit. The transceiver 47 is used to communicate with the hub 41 of the communication system 40.

It will be appreciated by persons skilled in the art that various modifications may be made to the above embodiments without departing from the scope of the present invention. For example, whilst some of the above embodiments have been described with reference to three TDMA-based wireless communication networks that make use of the same communication channel, the present invention is equally applicable to scenarios in which more than three networks make use of the same communication channel.

The invention claimed is:

1. A method for enabling two or more TDMA-based wireless networks to share a communication channel, the communication channel being divided into a plurality of superframes, wherein each superframe includes a fixed number of time slots and each wireless network implementing superframes, the method comprising:
within each network, implementing active superframes separated by one or more inactive superframes and only implementing active superframes when the other networks are implementing inactive superframes, wherein a network only communicates during that networks active superframes and does not communicate during that network's inactive superframes and wherein communication within each network only occurs in the time slots of that network's active superframes;
wherein the active superframes are implemented by the network without the need for that network to actively co-operate or communicate with any other network;
further comprising, at each network:
when the network wants to begin using the communication channel, determining if one or more other networks are using the communication channel;
if it is determined that no other networks are using the communication channel, implementing active superframes separated by one or more inactive superframes; and
if it is determined that one or more other networks are using the communication channel, determining if a superframe is available during which the one or more other networks are all implementing inactive superframes and, if there is a superframe available, implementing active superframes separated by one or more inactive superframes and only implementing active superframes when the other networks are implementing inactive superframes;
wherein each network transmits a beacon during that networks active superframes; and
wherein the beacon further includes a sequence value indicating when the network that transmitted the beacon began using the communication channel relative to the other networks that are using communication channel.

2. The method of claim 1, wherein the step of determining if one or more other networks are using the communication channel comprises:
attempting to detect beacons that are transmitted by one or more other networks;
if no beacons are detected, determining that no other networks are using the communication channel; and
if one or more beacons are detected, determining that one or more other networks are using the communication channel.

3. The method as claimed in claim 2, wherein a beacon includes an indication of when the network that transmitted the beacon will implement active superframes and when it will implement inactive superframes.

4. The method as claimed in claim 3, wherein the step of determining if a superframe is available during which the one or more other networks are all implementing inactive superframes comprises:
for each beacon that is detected, analysing the beacon to determine when the network that transmitted the beacon will implement active superframes and when it will implement inactive superframes.

5. The method as claimed in claim 1, wherein the step of determining if a superframe is available during which the one or more other networks are all implementing inactive superframes further comprises:
analysing the sequence value within each beacon that is detected to determine if there are any other networks using the communication channel for which a beacon has not yet been detected; and
if it is determined that there are other networks using the communication channel for which a beacon has not yet been detected, attempting to detect further beacons.

6. The method as claimed in claim 1, wherein, if a network intends to stop using the communication channel, including within a beacon subsequently transmitted by that network an indication of when the network intends to stop using the communication channel.

7. The method as claimed in claim 6, and further comprising, at each network:
if a network detects a beacon that includes an indication of when the network that transmitted the beacon intends to stop using the communication channel, determining when the network that transmitted the beacon stops using the communication channel and, if required, adjusting the sequence value included within a beacon subsequently transmitted by the network.

8. The method as claimed in claim 6, wherein the indication of when the network intends to stop using the communication channel comprises a value indicating the number of active superframes that the network will implement before it stops using the communication channel.

9. A hub for a TDMA-based wireless network, the hub comprising:
- a transceiver for communicating with one or more nodes of the network using a communication channel, the communication channel being divided into a plurality of superframes, wherein each superframe includes a fixed number of time slots; and
- a processor for implementing active superframes separated by one or more inactive superframes and only implementing active superframes when one or more other TDMA-based wireless networks that are also using the communication channel are implementing inactive superframes, wherein a network only communicates during that networks active superframes and does not communicate during that network's inactive superframes and wherein communication within each network only occurs in the time slot of that network's active superframes; and
- wherein the active superframes are implemented by the hub without the need for the hub to actively co-operate or communicate with any other network;
- wherein the processor is further arranged to:
- determine if one or more other networks are using the communication channel;
- if it is determined that no other networks are using the communication channel, implement active superframes separated by one or more inactive superframes; and
- if it is determined that one or more other networks are using the communication channel, determine if a superframe is available during which the one or more other networks are all implementing inactive superframes and, if there is a superframe available, implement active superframes separated by one or more inactive superframes and only implement active superframes when the other networks are implementing inactive superframes;
- wherein the processor is further arranged to transmit a beacon, using the transceiver, during the networks active superframes; and
- wherein the processor is further arranged to include a sequence value within the beacon that indicates when the network that transmitted the beacon began using the communication channel relative to the other networks that are using communication channel.

10. The hub as claimed in claim 9, wherein, in order to determine if one or more other networks are using the communication channel, the processor is further arranged to:
- attempt to detect beacons that are transmitted by one or more other networks;
- if no beacons are detected, then determine that no other networks are using the communication channel; and
- if one or more beacons are detected, then determine that one or more other networks are using the communication channel.

11. The hub as claimed in claim 9, wherein the processor is further arranged to include within the beacon an indication of when the network will implement active superframes and when it will implement inactive superframes.

12. The hub as claimed in claim 11, wherein, in order to determine if a superframe is available during which the one or more other networks are all implementing inactive superframes, the processor is further arranged to:
- for each beacon that is detected, analyse the beacon to determine when the network that transmitted the beacon will implement active superframes and when it will implement inactive superframes.

13. The hub as claimed in claim 9, wherein, in order to determine if a superframe is available during which the one or more other networks are all implementing inactive superframes, the processor is further arranged to:
- analyse the sequence value within each beacon that is detected to determine if there are any other networks using the communication channel for which a beacon has not yet been detected; and
- if it is determined that there are other networks using the communication channel for which a beacon has not yet been detected, then attempt to detect further beacons.

14. The hub as claimed in claim 13, wherein the processor is further arranged to: detect a beacon that includes an indication of when the network that transmitted the beacon intends to stop using the communication channel;
- determine when the network that transmitted the beacon stops using the communication channel; and
- if required, adjust the sequence value included within a subsequently transmitted beacon.

15. The hub as claimed in claim 9, wherein the processor is further arranged to include within a beacon an indication of when the network intends to stop using the communication channel, if the network intends to stop using the communication channel.

16. The hub as claimed in claim 15, wherein, in order to include the indication of when the network intends to stop using the communication channel, the processor is further arranged to include within a beacon a value indicating the number of active superframes that will be implemented before it stops using the communication channel.

17. A TDMA-based wireless communication system, the system comprising:
- a hub according to claim 9; and one or more nodes.

18. A TDMA-based wireless communication system as claimed in claim 17, wherein each of the one or more nodes comprise:
- a transceiver for communicating with a hub of the network using a communication channel, the communication channel being divided into a plurality of superframes, wherein each superframe includes a fixed number of time slots; and
- a processor for ensuring that communication only takes place during active superframes and does not take place during inactive superframes and wherein communication within said network only occurs in the time slots of that network's active superframes, the active superframes and inactive superframes having been defined in instructions received from the hub.

19. A node for a TDMA-based wireless network, the node comprising:
- a transceiver for communicating with a hub of the network using a communication channel, the communication channel being divided into a plurality of superframes, wherein each superframe includes a fixed number of time slots; and
- a processor for ensuring that communication only takes place during active superframes and does not take place during inactive superframes and wherein communication within said network only occurs in the time slots of that network's active superframes, the active superframes and inactive superframes having been defined in instructions received from the hub; and,
- wherein the active superframes are implemented by the hub without the need for the hub to actively co-operate or communicate with any other network;
- wherein the processor is further arranged to:
- determine if one or more other networks are using the communication channel;

if it is determined that no other networks are using the communication channel, implement active superframes separated by one or more inactive superframes; and if it is determined that one or more other networks are using the communication channel, determine if a superframe is available during which the one or more other networks are all implementing inactive superframes and, if there is a superframe available, implement active superframes separated by one or more inactive superframes and only implement active superframes when the other networks are implementing inactive superframes;

wherein the processor is further arranged to transmit a beacon, using the transceiver, during the networks active superframes; and wherein the processor is further arranged to include a sequence value within the beacon that indicates when the network that transmitted the beacon began using the communication channel relative to the other networks that are using communication channel.

* * * * *